(12) United States Patent
Nerowski et al.

(10) Patent No.: US 11,231,306 B2
(45) Date of Patent: Jan. 25, 2022

(54) ULTRASOUND FLOW MEASUREMENT APPARATUS AND METHOD FOR DETERMINING THE FLOW RATE

(71) Applicant: SICK ENGINEERING GMBH, Ottendorf-Okrilla (DE)

(72) Inventors: Alexander Nerowski, Waldkirch (DE); Henri Kirmse, Waldkirch (DE); Martin Oberländer, Waldkirch (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 337 days.

(21) Appl. No.: 16/213,225

(22) Filed: Dec. 7, 2018

(65) Prior Publication Data
US 2019/0242736 A1    Aug. 8, 2019

(30) Foreign Application Priority Data
Feb. 6, 2018  (EP) .................................... 18155300

(51) Int. Cl.
*G01F 1/66*    (2006.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| 4,467,659 A | 8/1984 | Baumoel | |
| 6,487,916 B1 * | 12/2002 | Gomm | G01F 1/667 |
| | | | 73/861.27 |
| 6,895,823 B1 * | 5/2005 | Herrmann | G01F 1/662 |
| | | | 73/861.23 |
| 2005/0066744 A1 | 3/2005 | Kupnik et al. | |

(Continued)

FOREIGN PATENT DOCUMENTS

| DE | 2950732 A1 | 7/1980 |
| EP | 1378727 B1 | 11/2005 |

(Continued)

OTHER PUBLICATIONS

Search Report dated Aug. 1, 2018 issued in corresponding European Application No. 18155300.9.

*Primary Examiner* — Arleen M Vazquez
*Assistant Examiner* — Brandon J Becker
(74) *Attorney, Agent, or Firm* — Nath, Goldberg & Meyer; Jerald L. Meyer

(57) ABSTRACT

An ultrasound flow measurement apparatus (10) for determining the flow rate of a fluid flowing in a line (12) is provided having at least one measurement path (18) at which a first ultrasonic transducer (16a) and a second ultrasonic transducer (16b) are arranged opposite one another with the flowing fluid between them, and having an evaluation unit that is configured to calculate the flow rate from a time of flight difference of ultrasonic pulses along the measurement path (18) in the direction with the flow (14) and against the flow (14). The ultrasonic transducers (16a-b) here are positioned such that a specific part pulse is isolated in time in a received signal of the respective receiving ultrasonic transducer (16a-b), with the part pulse corresponding to a direct sound, a reflected sound, an axially broken fluid sound, or an azimuthally broken fluid sound.

15 Claims, 2 Drawing Sheets

(56) References Cited

U.S. PATENT DOCUMENTS

| | | | |
|---|---|---|---|
| 2007/0169536 A1* | 7/2007 | Cotton | G01F 25/003 |
| | | | 73/1.16 |
| 2007/0220995 A1* | 9/2007 | Kishiro | G01F 1/662 |
| | | | 73/861.28 |
| 2008/0141786 A1 | 6/2008 | von Klooster et al. | |
| 2013/0043867 A1* | 2/2013 | Corum | G01R 33/4616 |
| | | | 324/309 |
| 2014/0144247 A1* | 5/2014 | Wiest | G01F 1/662 |
| | | | 73/861.31 |
| 2015/0355002 A1 | 12/2015 | Sasaki et al. | |
| 2016/0093280 A1* | 3/2016 | Ueberschlag | G01F 15/18 |
| | | | 73/861.18 |
| 2017/0219400 A1* | 8/2017 | Umezawa | G01F 1/667 |
| 2017/0268915 A1* | 9/2017 | Gestner | G01N 29/44 |

FOREIGN PATENT DOCUMENTS

| | | |
|---|---|---|
| EP | 3246668 A1 | 11/2017 |
| WO | 2016016818 A1 | 2/2016 |

\* cited by examiner

ULTRASOUND FLOW MEASUREMENT APPARATUS AND METHOD FOR DETERMINING THE FLOW RATE

FIELD

The invention relates to an ultrasound flow measurement apparatus for determining the flow rate of a fluid flowing in a line having at least one measurement path at which a first ultrasonic transducer and a second ultrasonic transducer are arranged opposite one another with the flowing fluid between them, and having an evaluation unit that is configured to calculate the flow rate from a time of flight difference of ultrasonic pulses along the measurement path in the direction with the flow and against the flow. The invention further relates to a method for determining the flow rate of a fluid flowing in a line in which ultrasound signals are transmitted and received in a direction with and against the flow and the flow rate is calculated from a time of flight difference of the ultrasound signals along at least one measurement path at which a first ultrasonic transducer and a second ultrasonic transducer are arranged opposite one another with the flowing fluid between them.

BACKGROUND

A proven method for measuring the flow rate or the velocity of flow is the differential time of flight method. In this respect, a pair of ultrasonic transducers is mounted with mutual offset in the longitudinal direction at the outer periphery of the conduit, said pair of ultrasonic transducers transmitting and registering ultrasonic signals alternately transversely to the flow along the measurement path spanned between the ultrasonic transducers. The ultrasound signals transported through the fluid are accelerated or decelerated by the flow depending on the running direction. The resulting time of flight difference is calculated using geometrical parameters to form a mean flow rate of the fluid. The volume flow or flow rate results from this with the cross-sectional area. For more exact measurements, a plurality of measurement paths each having a pair of ultrasonic transducers can also be provided to detect a flow cross-section more accurately.

The ultrasonic transducers used to generate the ultrasound have an oscillating body, frequently a ceramic material. With its aid an electric signal is, for example, converted into ultrasound, and vice versa, on the basis of the piezoelectric effect. Depending on the application, the ultrasonic transducer works as a sound source, as a sound detector or as both. In this respect, a coupling has to be provided between the fluid and the ultrasonic transducer. A widespread solution comprises introducing the ultrasonic transducer into the line with a direct contact to the fluid. Such intrusive probes can, however, make exact measurements more difficult due to a disturbance of the flow. Conversely, the submerging ultrasonic transducers are exposed to the fluid and to its pressure and temperature and are thereby possibly damaged, particularly in the case of corrosively acting or abrasively acting media, or they lose their function due to deposits.

In general, techniques are also known having a completely non-intrusive measurement device, in which techniques the inner wall remains completely closed or smooth. One example is the so-called clamp-on assembly, for instance in accordance with U.S. Pat. No. 4,467,659, with which two-wedge-shaped ultrasonic transducers are fastened to the line from the outside. A disadvantage due to the principle is that only measurement paths that pass through the center axis of the pipe can be implemented due to the directivity of the wedge transducers. Such diametric measurement paths are often unfavorable from the aspect of flow mechanics sine they generate additional measurement errors on changes of the flow profile, for instance due to disturbed states.

EP 1 378 727 B1 proposes attaching the ultrasound-generating elements to an outer side of a wall. Unlike the clamp-on technique, the ultrasonic transducer is in this respect so-to-say integrated into the wall. A pocket having a substantially smaller wall thickness than the remaining wall is formed in the region of the ultrasonic transducers and the remaining wall thickness forms the membrane of the ultrasonic transducer. With such a manner of measurement that is also called clamp-in, the ultrasonic transducers are now also able to implement non-diametric or off-center paths, so-called secant paths, due to their irradiation characteristics that almost correspond to a simple sound source, whereby an increased robustness with respect to disruptions of the flow can be achieved.

However, due to the concept, the pipe wall is also excited so that different propagation paths of the ultrasonic signal result in the pipe wall and in the fluid. Measurement errors in a clearly two-digit measurement percentage range occur due to such superpositions. The absolute time of flight of the superposed sound portions is greatly dependent on the speed of sound of the fluid and also on the material properties of the pipe wall in addition to the pipe geometry. They thus cause a measurement error that above all depends very sensitively on the speed of sound and that cannot be sensibly calibrated.

SUMMARY

It is therefore the object of the invention to improve the accuracy of an ultrasound differential time of flight method.

This object is satisfied by an ultrasound flow measurement apparatus and by a method for determining the flow rate of a fluid flowing in a line in accordance with the respective independent claim. Two ultrasonic transducers span a measurement path through the flowing fluid and measure its flow rate by means of a differential time of flight method by alternately transmitted and received ultrasonic pulses or ultrasonic packets having a pulse-shaped envelope and some periods of the ultrasonic frequency.

The invention now starts from the basic idea of isolating in time a specific part pulse in the superposition of different sound portions of the respective received signal. This is done by an especially adapted positioning of the ultrasonic transducers and thus of the measurement path. The time-isolated or separated specific part pule can now be evaluated without any influence from other sound portions. This is naturally only possible within a technically sensible framework; the specific part pulse also has lateral overshoots that are possibly still superposed by other overshoots. What is decisive is that the specific part pulse can be localized in time and that superpositions through other sound portions here hardly contribute any measurement error and where possible practically no measurement error.

It is assumed here that the received signal is a superposition of direct noise, reflected noise, axially broken fluid noise and azimuthally broken fluid noise. There are additionally structural portions and structure-borne noise portions having propagation paths completely in the line wall that can be compensated in a different manner and are not looked at further here. The direct noise corresponds to the direct propagation path between the ultrasonic transducers and thus the measurement path. Reflected noise is likewise noise that is directly irradiated into the fluid, but that only arrives at the oppositely disposed ultrasonic transducer after at least one reflection inwardly at the line wall. The further portions are in summary called indirect fluid noise because here the acoustic wave first propagates in the line wall, then couples into the fluid, and moves in the fluid to the receiving ultrasonic transducer. In accordance with the invention, a specific part pulse that is isolated in time in the received signal is selected from this superposition by a special arrangement of the ultrasonic transducers.

The invention has the advantage that the influence of superpositions of in particular the indirect fluid sound on the specific part pulse becomes negligible by an arrangement of the ultrasonic transducers in accordance with the invention. The specific part pulse is thereby separated in time from all the other fluid sound portions and an exact evaluation is possible using classical methods such as Hilbert transformation. The interference influence due to pulse superpositions is eliminated here because no superpositions occur in the received signal section of the specific part pulse to be evaluated. This also results in every case in better measurement results than with any algorithms for pulse separation or other filtering or correction of influences of the superposition since specific residual errors are unavoidable in an algorithm and the incoming signal already no longer includes the error source on the physical plane in accordance with the invention.

The specific part pulse is preferably the direct pulse of the direct sound on the measurement path. The flow rate can be measured most simply from the direct pulse; the other superpositions and part pulses are typically understood as interference. The evaluation of the direct pulse can remain uninfluenced by the superpositions due to the time isolation in accordance with the invention due to the arrangement of the ultrasonic transducers. In principle, however, the other part pulses also include the measurement information sine their propagation paths include unadulterated fluid paths that can also be determined by the geometry that is known overall. Such an evaluation would, however, in any case be more laborious and often also less accurate than that of the direct pulse.

The direct pulse is preferably first detected in the received signal and further part pulses only follow at a minimum time interval. The evaluation of the direct pulse is then particularly simple in that a restriction to the initial range of the received signal takes place. The arrangement in accordance with the invention of the ultrasonic transducers provides that this initial range having the direct pulse is not yet superposed with signal portions of other sound portions.

The specific part pulse preferably has a spacing of at least two periods from further part pulses in the received signal. This is a quantification of the time isolation that can be achieved by the arrangement of the ultrasonic transducers and that is also sufficient for a robust evaluation without interfering influences due to superposition. The period is that of the ultrasound frequency. The two periods are an exemplary lower limit. A weaker time isolation with fewer than two periods can also be sufficient while more than two periods, if implementable, can further improve the evaluation.

The line wall of the line preferably has pockets in which a thin-walled region inwardly remains, with the ultrasonic transducers being arranged in a respective one pocket and which have an oscillating body that couples to the thin-walled region that acts as a membrane of the ultrasonic transducer capable of vibration. The clamp-in assembly explained in the introduction is thus implemented that also enables secant paths. The assumptions on the superposition of said fluid sound portions are a particularly good match here. Alternatively, a clamp-on assembly would also not be precluded where the ultrasonic transducers are attached to the line from the outside. However, this leaves less freedom in arranging the ultrasonic transducers; only diametric paths are in particular possible. Certain sound portions therefore do not occur or behave differently and it can be made substantially more difficult and even impossible depending on the constellation to isolate the specific part pulse as desired.

The ultrasonic transducers are preferably arranged at a secant angle of at least 17°, 22°, 27°, 32°, or 37° and/or at a secant angle of at most 43° or 38°, with the secant angle being the angle measured in a cross-section of the line of the measurement path projected onto the cross-section against the diameter of the line extending through the first ultrasonic transducer. The definition of the secant angle on the basis of the first ultrasonic transducer takes place without any limitation of the general applicability since both ultrasonic transducers swap their roles by the alternate measurement. The secant angle is an important parameter, in addition to the axial spacing introduced later, to characterize the arrangement of ultrasonic transducers. Said lower limits and upper limits produce a plurality of advantageous intervals.

The secant angle is preferably in the interval [27°, 38°], at least [22°, 38°], or at least [17°, 38°], at a nominal diameter of the line DN50; in the interval [27°, 38°], at least [22°, 43°], or at least [17°, 43°] at a nominal diameter DN80; in the interval [32°, 43°], at least [22°, 43°], or at least [17°, 43°] at a nominal diameter DN100; and in the interval [37°, 43°], at least [32°, 43°], or at least [22°, 43°], at a nominal diameter DN150. There are certain demands on the secant angle that generally apply, as indicated by lower limits and upper limits in the previous paragraph. A good optimization, however, does not take place generally, but rather with regard to the pipe diameter and possibly also to certain material parameters such as indicated here. The respective closest interval is here best suited, i.e. the required separation is achieved for a particularly large window for the speed of sound; the two larger intervals then increasingly restrict the window of the speed of sound. The wider the interval therefore is, the better it is a match for different units and nominal diameters, but at the cost of tighter assumptions on the specific measurement situation and specifically on the window for the speed of sound.

The ultrasonic transducers preferably have an axial spacing of at least 12 mm, 27 m, 37 mm, 42 mm, or 67 mm and/or an axial spacing of at most 38 mm, 43 mm, or 73 mm, with the axial spacing being the spacing between the ultrasonic transducers in the longitudinal direction of the line. This is the already addressed second important possible parameter for characterizing an arrangement in accordance with the invention of ultrasonic transducers. The lower limits and upper limits in turn produce a plurality of advantageous intervals. However, not all combinations are possible here since some resulting intervals would be empty. This is due to the dependence on the nominal diameter that is changed in comparison with the secant angle. Some of the wider intervals are admittedly advantageous for all the nominal diameters; however, the ideal intervals for some nominal diameters exclude one another.

The axial spacing is preferably in the interval [27 mm, 38 mm], at least [12 mm, 43 mm] at a nominal diameter of the line DN50, and is in the interval [12 mm, 73 mm] at a nominal diameter of DN80, DN100, or DN150. The statements on the secant angle apply accordingly to the advantageous intervals of the axial spacing. However, a common interval of the axial spacing can be specified for larger nominal diameters DN80, DN100, DN150 with which then a large window for the speed of sound is already covered independently of the nominal diameter.

The axial spacing preferably amounts to at least 42 mm with a nominal diameter of the line of DN80; to at least 38 mm with a nominal diameter of DN100; and to at least 62 mm or to at least 27 mm with a nominal diameter of DN150. As stated in the previous paragraph, the interval [12 mm, 73 mm] is already very well suited for all these nominal diameters together. A further optimization is possible, that is an even larger window for the speed of sound is therefore covered, by individual lower limits in dependence on the nominal diameter.

The respective conditions are preferably satisfied both for the secant angle and for the axial spacing. Particularly good results are produced when the respective intervals for the secant angle and the axial spacing are observed in combination at a specific nominal diameter. Further preferably, the respective closest, middle or widest intervals are combined with one another.

The line preferably comprises steel or aluminum and is in particular manufactured therefrom. Said values for the secant angle and the axial spacing are particularly suitable for this material, that is they produce a clear time isolation of the specific part pulse, here in particular of the direct pulse.

The product of wall thickness of the line and the frequency of the ultrasound is preferably in the interval [1400, 2800] mkHz. Like the material steel or aluminum, this is a further condition in which said values are particularly advantageous for the secant angle and the axial spacing.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1A:
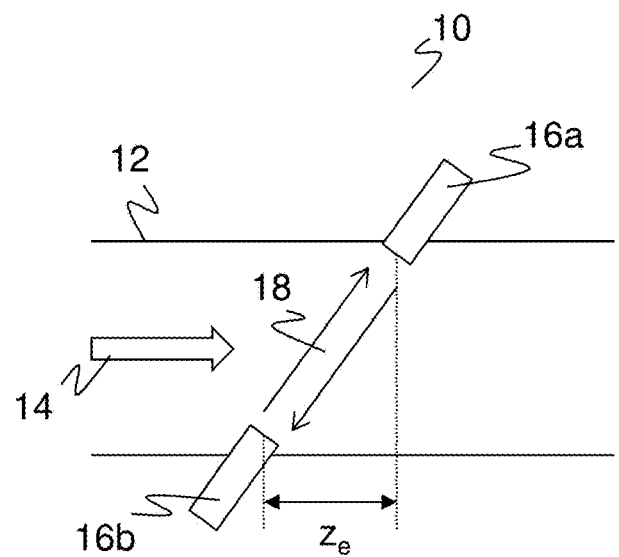
FIG. 1a a schematic longitudinal sectional view of a line for explaining the differential time of flight method for a flow measurement using ultrasound, FIG. 1b a schematic representation of a line wall for explaining the clamp-in assembly of an ultrasonic transducer.

FIG. 1a shows in a longitudinal sectional view an ultrasound flowmeter 10 in accordance with the differential time of flight method that is installed at a pipe or at a line 12. A fluid flows through the line 12 in the direction marked by the arrow 14. A pair of ultrasonic transducers 16a-b is arranged at a line wall to selectively transmit and receive an ultrasound signal in the one or the other direction along a measurement path 18 spanned between the ultrasonic transducers 16a-b.

The two ultrasonic transducers 16a-b are offset with respect to one another in the longitudinal direction of the line 12, where $z_e$ designates the corresponding axial spacing. The fluid sound thereby moves with the flow in the one direction and against the flow in the other direction. A time of flight difference results from this from which the flow rate of the fluid can be calculated. The evaluation, that is also known up to this point, takes place in a control and evaluation unit, not shown, of the ultrasound flowmeter 10 that is connected to the ultrasonic transducers 16a-b.

The line 12 in the region of the ultrasound measurement forms a measurement body of the ultrasound flowmeter 10. The representation has been selected as if this measurement body were an integral part of the existing line 12. This is possible in principle, but in practice, the ultrasound flowmeter 10 is manufactured with its own measurement body that replaces a corresponding section of an existing line after the assembly and is for this purpose, for example, inserted at both sides by flange connections.

FIG. 1a only shows one measurement path 18. Multi-path systems are also possible in which additional ultrasonic transducers span further measurement paths to detect the flow at a plurality of points and thus more accurately. This is, however, not looked at in any more detail; the ultrasonic flowmeter 10 is described as representative at one measurement path.

Figure 1B:
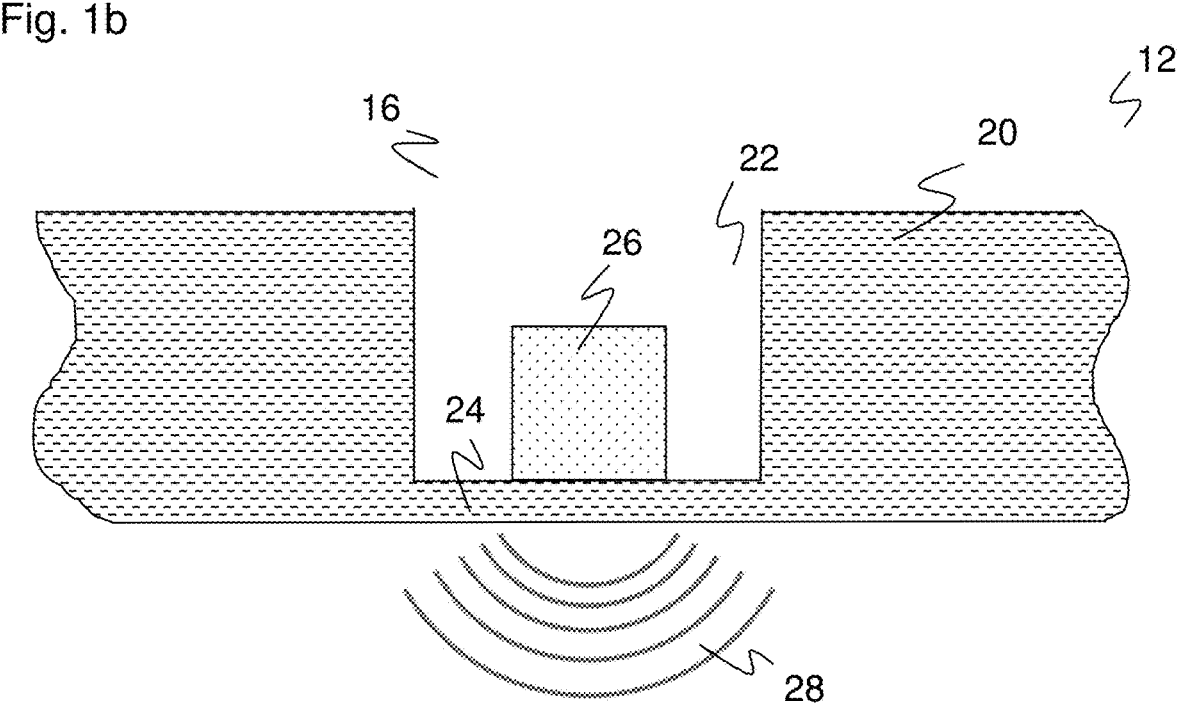

FIG. 1b shows a schematic representation of a line wall 20 of the line 12 to explain the clamp-in assembly of an ultrasonic transducer 16. The clamp-in assembly makes use of the advantages in accordance with the invention to a special degree, but a clamp-on installation is alternatively not precluded.

In the clamp-on assembly, a hollow space or a pocket 22 is formed in the line wall 20. A thin-walled part region 24 of the line wall 20 remains toward the inside in the region of the pocket 22; it simultaneously serves as a membrane of the ultrasonic transducer 16a and is excited to oscillate by its oscillating body 26, for example a piezoceramic material, to transmit an ultrasonic signal; or conversely, it is excited to oscillate on an impact of an ultrasonic signal from the interior of the line 12 on the part region 24 of the oscillating body 26. For simplification, only the oscillating body 26 of the ultrasonic transducer 15 is shown in FIG. 1b. The thin-walled part region 24 remains stable enough to withstand an internal line pressure to be expected. The line wall 20 forms an inner surface closed in itself without recesses or projections that could disturb the flow or at which deposits could settle.

As indicated by sound propagation lines 28, the outward and inward irradiation directions of the ultrasonic transducers 16a-b are perpendicular to a center axis of the line 12. In order nevertheless to achieve an axial offset and thus a measurement effect in a time of flight differential method, a relatively broad irradiation characteristic is provided. It is alternatively conceivable to arrange the ultrasonic transducer 16 obliquely, with this, however, being more laborious and/or expensive from a construction aspect and possibly also requiring modifications of the line wall 20 that also have an effect on the flow.

Figure 2:
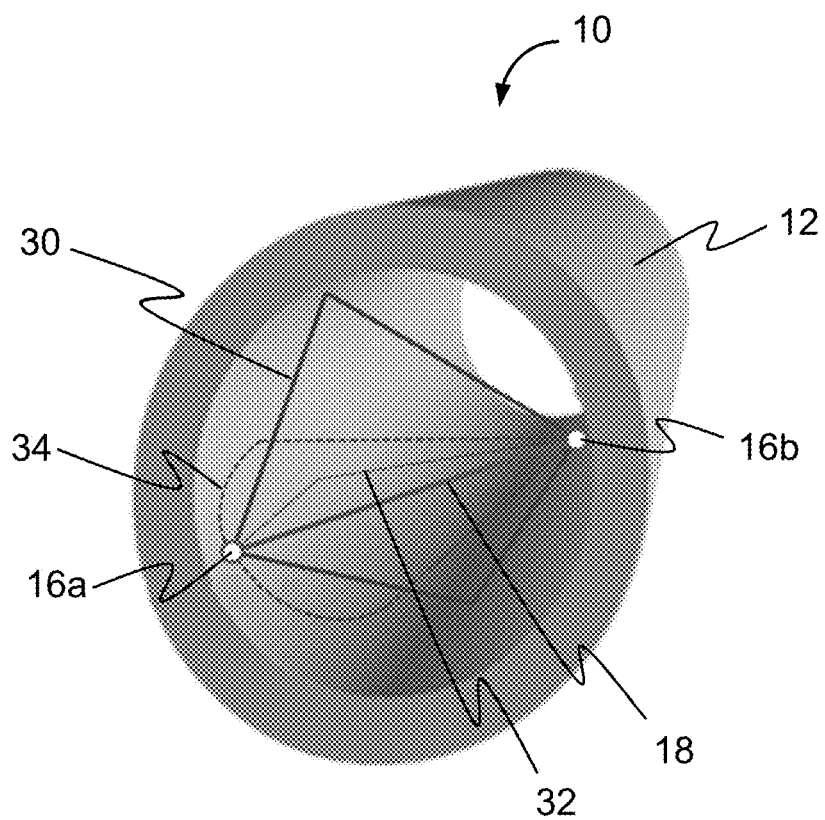
FIG. 2 a three-dimensional view of a line section for explaining the different propagation paths of the ultrasound.

FIG. 2 is a perspective representation of a line wall section with the ultrasound flow measurement apparatus 10 to illustrate the possible propagation paths of the ultrasound from the transmitting ultrasonic transducer 16a to the receiving ultrasonic transducer 16b. It must be remembered that the ultrasonic transducers 16a-b are only fixed in a snapshot as transmitter and receiver since they swap their roles for a differential time of flight measurement.

There are two unadulterated fluid signals, namely a direct pulse on the measurement path 18 that represents the direct path between the ultrasonic transducers 16a-b and reflections 30 on indirect paths after a reflection at the inner side of the line wall 20. There is additionally indirect fluid sound that first propagates in the line wall 20 and then exits into the fluid and runs exactly to the receiving ultrasonic transducer 16b. The indirect fluid sound is first distinguished into an axially broken indirect fluid sound 32 that first runs in a straight line in the line 12 on a projection of the measurement path 18 and into an azimuthally broken indirect fluid sound 34 that first runs in the line 12. There is additionally structure-borne sound having propagation paths only in the line wall 20 that are not discussed here since they can be compensated in a different manner or errors thereby generated are accepted.

The aim is now to isolate in time any desired pulse of the different sound portions, in particular the direct pulse, by a geometrical design or by an arrangement of the ultrasonic transducers 16a-b such that no further pulse arrives at the receiver and the selected pulse is thus free of interference influences over a wide speed of sound range of the fluid with, where possible, some periods of interval. The period duration relates to the ultrasound frequency and amounts, for example, to approximately 1.4 µs.

Figure 3A:
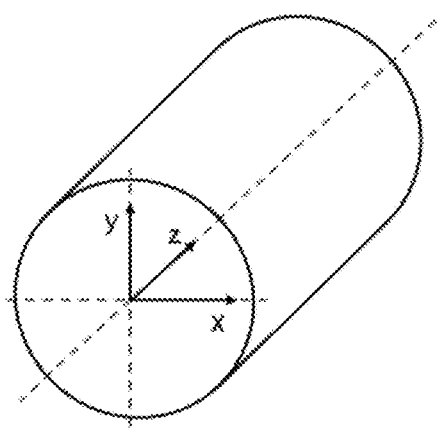
FIG. 3a a three-dimensional sketch for introducing a coordinate system.
Figure 3B:
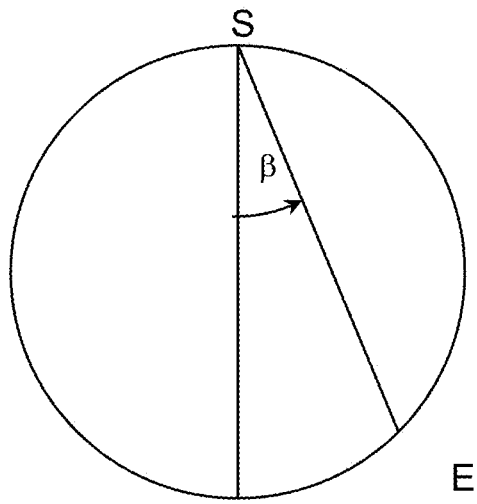
FIG. 3b a representation of a pipe cross-section for the definition of geometrical values.

FIG. 3a illustrates a three-dimensional coordinate system in the line 12. FIG. 3b shows a cross-section of the line 12. The arrangement of the ultrasonic transducers 16a-b can be described by the secant angle $\beta$ by which the direct connection line or the measurement path between the receiver E and the transmitter S is tilted with respect to the diameter starting from the transmitter S and with respect to the mutual axial spacing in the longitudinal direction of the line 12 or the Z direction.

The axial spacing $z_e$ and the secant angle $\beta$ are used in the following as parameters for the characterization of the arrangement of the ultrasonic transducers 16a-b. The axial spacing $z_e$ is already shown in FIG. 1 and designates the spacing of the ultrasonic transducers 16a-b in the longitudinal direction of the line 12, in the Z direction in the coordinate system of FIG. 3a. The secant angle measures the angular offset with respect to a diameter of the line 12, as shown in FIG. 3b.

There are further dependencies of the material parameters of density, modulus of elasticity, and Poisson's ratio, as well as of the line wall thickness. Steel or aluminum is assumed as the material here and the value wall thickness*frequency of the ultrasound is specified as the representative value for the underlying conditions not yet fixed. The arrangements are also still suitable on deviations from these underlying conditions, but a certain error can be added by such deviations.

To be able to easily evaluate the direct pulse, a spacing of at least two periods from the following pulse is required. The geometrical parameters of the arrangement of the ultrasonic transducers 16a-b were evaluated as to how large the window of the speed of sound of the fluid is in which this condition on the time isolation of the pulse is satisfied. In this respect, speeds of sound of 800 m/s to 2000 m/s are considered; the window for the speed of sound is therefore 1200 m/s in amount in the ideal state.

Suitable intervals are sought for the parameters of axial spacing $z_e$ and secant angle $\beta$. Even though a certain general optimization is possible, the best results are achieved individually for specific nominal diameters. In this respect, a quality criterion is the width of the window for the speed of sound with a sufficient time isolation of the pulse. Depending on the nominal diameter, the criterion is determined as follows (the given speeds of sound are widths of the window for the speed of sound in comparison with the 1200 m(s) which is only possible at all):

DN50: 900-1000 m/s: Ideal, 700-800 m/s: Very good, 500-600 m/s: Good,

DN80-DN100: 1100-1200 m/s: Ideal, 900-1000 m/s: Very good, 700-800 m/s: Good,

DN150: 1100-1000 m/s: Ideal, 900-1000 m/s: Very good, 700-800 m/s: Good.

The geometrical features for steel and aluminum as the line material shown in the following tables then result:

TABLE 1

DN50

| Wall thickness · Frequency [m · kHz] | Secant angle [°] | Axial spacing [mm] | Characteristic |
|---|---|---|---|
| 1400 ≤ f · d < 2800 | 27 ≤ β ≤ 38 | 27 mm ≤ $z_e$ ≤ 38 mm | Ideal |
| 1400 ≤ f · d < 2800 | 22 ≤ β ≤ 38 | 12 mm ≤ $z_e$ ≤ 43 mm | Very good |
| 1400 ≤ f · d < 2800 | 17 ≤ β ≤ 38 | 12 mm ≤ $z_e$ ≤ 43 mm | Good |

TABLE 2

DN80

| Wall thickness · Frequency [m · kHz] | Secant angle [°] | Axial spacing [mm] | Characteristic |
|---|---|---|---|
| 1400 ≤ f · d < 2800 | 27 ≤ β ≤ 38 | 42 mm ≤ $z_e$ ≤ 73 mm | Ideal |
| 1400 ≤ f · d < 2800 | 22 ≤ β ≤ 43 | 12 mm ≤ $z_e$ ≤ 73 mm | Very good |
| 1400 ≤ f · d < 2800 | 17 ≤ β ≤ 43 | 12 mm ≤ $z_e$ ≤ 73 mm | Good |

TABLE 3

DN100

| Wall thickness · Frequency [m · kHz] | Secant angle [°] | Axial spacing [mm] | Characteristic |
|---|---|---|---|
| 1400 ≤ f · d < 2800 | 32 ≤ β ≤ 43 | 37 mm ≤ $z_e$ ≤ 73 mm | Ideal |
| 1400 ≤ f · d < 2800 | 22 ≤ β ≤ 43 | 12 mm ≤ $z_e$ ≤ 73 mm | Very good |
| 1400 ≤ f · d < 2800 | 17 ≤ β ≤ 43 | 12 mm ≤ $z_e$ ≤ 73 mm | Good |

TABLE 4

DN150

| Wall thickness · Frequency [m · kHz] | Secant angle [°] | Axial spacing [mm] | Characteristic |
|---|---|---|---|
| 1800 ≤ f · d < 2800 | 37 ≤ β ≤ 43 | 62 mm ≤ $z_e$ ≤ 73 mm | Ideal |
| 1400 ≤ f · d < 2800 | 32 ≤ β ≤ 43 | 27 mm ≤ $z_e$ ≤ 73 mm | Very good |
| 1400 ≤ f · d < 2800 | 22 ≤ β ≤ 43 | 12 mm ≤ $z_e$ ≤ 73 mm | Good |

As an example, with a line having a nominal diameter of DN100, a window for the speed of sound of 1100-1200 m/s width is possible ("Ideal") if a secant angle of $32° \leq \beta \leq 43°$ and an axial spacing of 37 mm≤$z_e$≤73 mm is selected in accordance with Table 3 while observing the underlying conditions of wall thickness*frequency of 1400 mkHz≤f·d<2800 mkHz and the material aluminum/steel. If the underlying conditions are not observed, the measurement error increases or the window for the speed of sound decreases with a sufficient isolation of the pulse. Smaller secant angles and/or axial spacings likewise decrease the window for the speed of sound, wherein in accordance with Table 3 a width of the window for the speed of sound of 900 m/s-1000 m/s ("Very good") or of 700 m/s-800 m/s ("Good") remains ensured up to a secant angle of at most 22° or 17° and up to an axial spacing of at least 12 mm.

The tables relate to the case that the direct pule is isolated as the first pulse in the received signal. Alternatively, the ultrasonic transducers 16a-b can also be positioned such that a plurality of pulses, also indirectly irradiated, or reflections are, as described above, separated from one another in time.

The invention claimed is:

1. An ultrasound flow measurement apparatus for determining a flow rate of a fluid flowing in a line having a line wall, the ultrasound flow measurement apparatus having:
    at least one measurement path at which a first ultrasonic transducer and a second ultrasonic transducer are arranged substantially on opposite sides of a diameter of the line, opposite one another with the flowing fluid between them, and
    an evaluation unit that is configured to calculate the flow rate from a time of flight difference of ultrasonic pulses along said at least one measurement path in a first direction with the flow and a second direction against the flow,
    wherein the first ultrasonic transducer and the second ultrasonic transducer are positioned such that a specific part pulse is isolated in time in a received signal of a respective receiving ultrasonic transducer, with the specific part pulse corresponding to one of a direct sound, a reflected sound, an axially broken fluid sound, and an azimuthally broken fluid sound,
    and wherein the first ultrasonic transducer and the second ultrasonic transducer are arranged on opposite sides along a secant line extending across a path within confines of the line wall at a secant angle of at least 17° and at most 43', with the secant angle being an angle measured in a cross-section of the line of said at least one measurement path projected onto the cross-section with respect to a diameter of the line extending through the first ultrasonic transducer and thereby providing the isolation in time of the specific part pulse so as to isolate the specific part pulse as a part pulse of interest in the received signal.

2. The ultrasound flow measurement apparatus in accordance with claim 1, wherein the specific part pulse is a direct pulse of the direct sound on said at least one measurement path.

3. The ultrasound flow measurement apparatus in accordance with claim 2, wherein the direct pulse is detected first in the received signal and further part pulses only follow at a minimum time interval.

4. The ultrasound flow measurement apparatus in accordance with claim 1, wherein the specific part pulse has a spacing of at least two periods from further part pulses in the received signal.

5. The ultrasound flow measurement apparatus in accordance with claim 1, wherein the line wall of the line has pockets in which a thin-walled region remains inwardly, with the first ultrasonic transducer and the second ultrasonic transducer being arranged in a respective pocket and having an oscillating body that couples to the thin-walled region that acts as a membrane of the corresponding ultrasonic transducer capable of oscillation.

6. The ultrasound flow measurement apparatus in accordance with claim 1, wherein the arrangement of the transducers alternatively comprise arrangements according to nominal diameters of the line such that,
    at a nominal diameter DN50 of the line, the first ultrasonic transducer and the second ultrasonic transducer are arranged at a secant angle of at least 27°, and at most 38°,
    at a nominal diameter DN80 of the line, the first ultrasonic transducer and the second ultrasonic transducer are arranged at a secant angle of at least 27°, and at most 38°,
    at a nominal diameter DN100 of the line, the first ultrasonic transducer and the second ultrasonic transducer are arranged at a secant angle of at least 32°, and
    at a nominal diameter DN150 of the line, the first ultrasonic transducer and the second ultrasonic transducer are arranged at a secant angle of at least 37°.

7. The ultrasound flow measurement apparatus in accordance with claim 6, wherein the arrangement of the transducers alternatively comprise arrangements and axial spacings according to nominal diameters of the line such that,
    at a nominal diameter DN50 of the line, the first ultrasonic transducer and the second ultrasonic transducer are arranged at a secant angle of at least 27°, and at most 38°, and an axial spacing of at least 27 mm, and at most 38 mm
    at a nominal diameter DN80 of the line, the first ultrasonic transducer and the second ultrasonic transducer are arranged at a secant angle of at least 27°, and at most 38°, and the axial spacing of at least 42 mm, and at most 73 mm,
    at a nominal diameter DN100 of the line, the first ultrasonic transducer and the second ultrasonic transducer are arranged at a secant angle of at least 32°, and the axial spacing of at least 37 mm, and at most 73 mm, and
    at a nominal diameter DN150 of the line, the first ultrasonic transducer and the second ultrasonic transducer are arranged at a secant angle of at least 37°, and the axial spacing of at least 62 mm, and at most 73 mm.

8. The ultrasound flow measurement apparatus in accordance with claim 1, wherein the arrangement of the transducers alternatively comprise axial spacings according to nominal diameters of the line such that,
    at a nominal diameter DN50 of the line, the first ultrasonic transducer and the second ultrasonic transducer have an axial spacing of at least 27 mm, and at most 38 mm;
    at a nominal diameter DN80 of the line, the first ultrasonic transducer and the second ultrasonic transducer have the axial spacing of at least 42 mm, and at most 73 mm;
    at a nominal diameter DN100 of the line, the first ultrasonic transducer and the second ultrasonic transducer have the axial spacing of at least 37 mm, and at most 73 mm; and
    at a nominal diameter DN150 of the line, the first ultrasonic transducer and the second ultrasonic transducer have the axial spacing of at least 62 mm, and at most 73 mm,
    with the axial spacing being the spacing between the first ultrasonic transducer and the second ultrasonic transducer in the longitudinal direction of the line.

9. The ultrasound flow measurement apparatus in accordance with claim 8, wherein, at the nominal diameter DN50 of the line, the secant angle is an interval [27°, 38°];

at the nominal diameter DN80 of the line, the secant line is in the interval [32°, 43°]; and at the nominal diameter DN100 of the line the secant line is in the interval [37°, 43°].

10. The ultrasound flow measurement apparatus in accordance with claim 8, wherein, the secant angle is in an interval [27°, 38°] at the nominal diameter of the line DN50;

the secant angle is in the interval [27°, 38°] at the nominal diameter DN80;

the secant angle is in the interval [32°, 43°] at the nominal diameter DN100; and the secant angle is in the interval [37°, 43°] at a nominal diameter DN150, wherein the respective conditions are both satisfied at both the secant angle and at the axial spacing.

11. The ultrasound flow measurement apparatus in accordance with claim 1, wherein the line comprises steel or aluminum.

12. The ultrasound flow measurement apparatus in accordance with claim 11, wherein the line is manufactured from steel or aluminum.

13. The ultrasound flow measurement apparatus in accordance with claim 1, wherein a product of a wall thickness of the line and a frequency of the ultrasound pulses is in an interval [1400, 2800] mkHz.

14. A method of determining the flow rate of a fluid flowing in a line having a line wall in which ultrasound signals are transmitted and received in a direction with and against the flow and the flow rate is calculated from a time of flight difference of the ultrasound signals along at least one measurement path at which a first ultrasonic transducer and a second ultrasonic transducer are arranged substantially on opposite sides of a diameter of the line, opposite one another with the flowing fluid between them, wherein the first ultrasonic transducer and the second ultrasonic transducer are positioned such that a specific part pulse is isolated in time in a received signal of the respective receiving ultrasonic transducer, wherein the first ultrasonic transducer and the second ultrasonic transducer are arranged on opposite sides along a secant line extending across a path within the confines of the line wall at a secant angle of at least 17° and at most 43°, with the secant angle being an angle measured in a cross-section of the line of said at least one measurement path projected onto the cross-section with respect to a diameter of the line extending through the first ultrasonic transducer and thereby providing the isolation in time of the specific part pulse so as to isolate the specific part pulse as a part pulse of interest in the received signal, and wherein the specific part pulse is used as the basis for the calculation of the time of flight difference, with the specific part pulse corresponding to a direct sound, a reflected sound, an axially broken fluid sound, or an azimuthally broken fluid sound.

15. The method in accordance with claim 14, wherein the specific part pulse is a direct pulse received first of the direct sound on said at least one measurement path, with further part pulses only follow with a minimum time interval.

* * * * *

UNITED STATES PATENT AND TRADEMARK OFFICE
CERTIFICATE OF CORRECTION

PATENT NO. : 11,231,306 B2
APPLICATION NO. : 16/213225
DATED : January 25, 2022
INVENTOR(S) : Alexander Nerowski, Henri Kirmse and Martin Oberländer It is certified that error appears in the above-identified patent and that said Letters Patent is hereby corrected as shown below:

In the Claims

Claim 1, Column 9, Line 44, please delete the phrase "and at most 43', with the" and replace with "and at most 43°, with the".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*